UNITED STATES PATENT OFFICE.

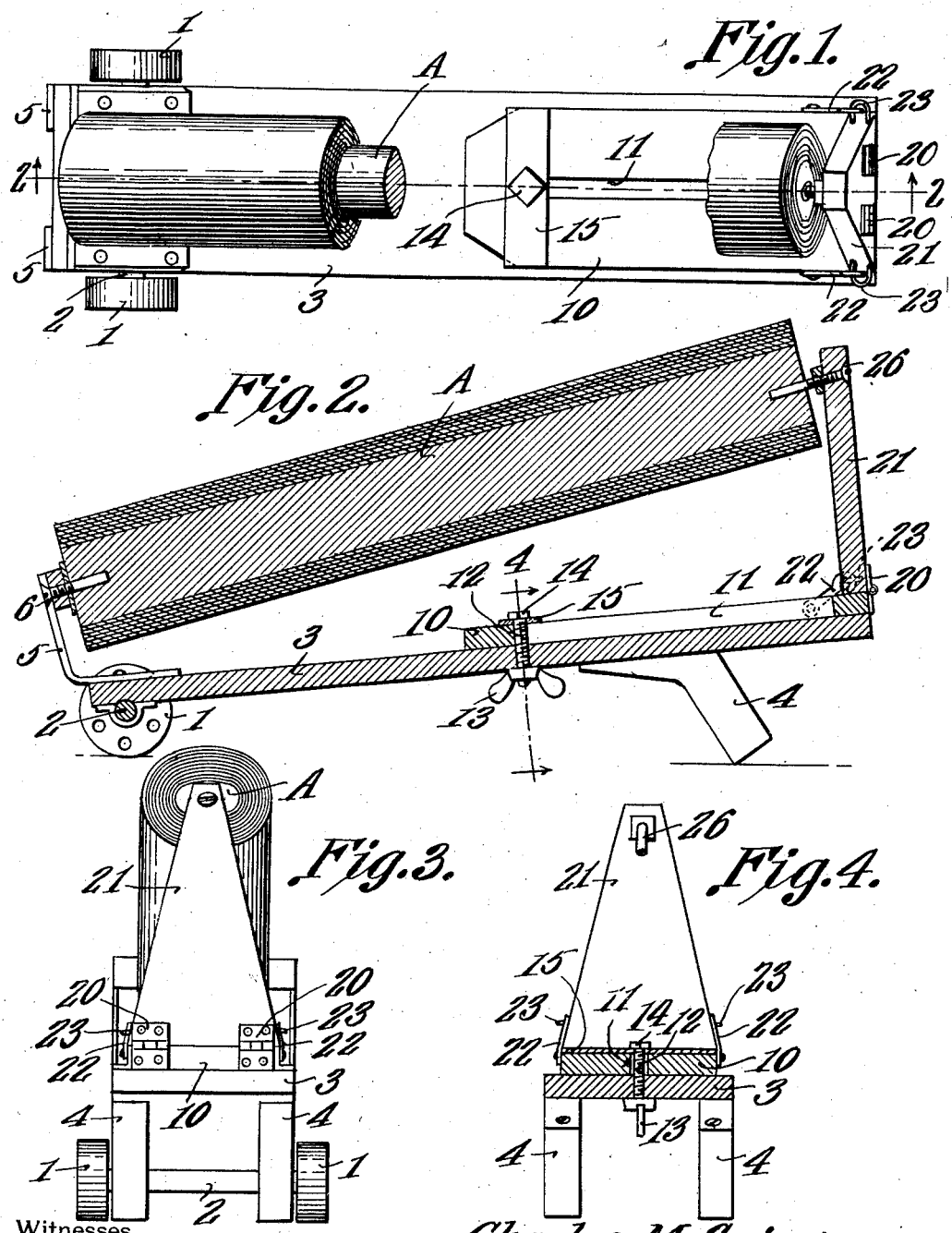

CHARLES McCORD GRIGG, OF JOPLIN, MISSOURI.

TRUCK.

1,016,490.   Specification of Letters Patent.   Patented Feb. 6, 1912.

Application filed March 16, 1911. Serial No. 614,850.

*To all whom it may concern:*

Be it known that I, CHARLES M. GRIGG, a citizen of the United States, residing at Joplin, in the county of Jasper and State of Missouri, have invented a new and useful Truck, of which the following is a specification.

This invention relates to trucks, and more especially to a truck adapted for handling rolls of car lining paper and other cylindrical wound articles which come in a variety of lengths; and the object of the same is to produce a truck especially adapted to hold them during the unwinding thereof or during the transporting of such articles.

This object is accomplished by the truck whose detailed construction is hereinafter more fully described and claimed, and as shown in the drawings wherein—

Figure 1 is a top plan view of this truck. Fig. 2 is a central longitudinal sectional view thereof. Fig. 3 is a rear end view of the truck, and Fig. 4 is a sectional view on the line 4—4 of Fig. 2.

In the drawings the numeral 1 designates truck wheels adapted to travel on the floor, and these wheels are mounted upon an axle 2 which in turn is carried by and beneath the lower end of the truck body 3, the latter being usually a long piece of board or plank having handles 4 at a proper point to serve for lifting the rear end of the body when desired or to serve as feet when the body is let down to the position shown in Fig. 2. Rising from the lower end of the body is an iron bracket 5, and 6 is a pin projecting upward from said bracket as best seen in Fig. 2.

The numeral 10 designates an adjustable member which consists in the present instance of a plank, a little less in width than that of the body 3 as seen in Fig. 1, and having a longitudinal slot 11 for the reception of a bolt 12 which passes downward through said slot and through the body 3 and receives a wing nut 13 at its lower end, its head 14 being at the upper end of its body and lying over a washer 15 which is wider than said slot 11. By this means it will be clear that the adjustable member or plank 10 can be adjusted longitudinally upon the body member 3.

Hinged to the upper end of the plank 10 as at 20 is an upright 21 which, when it stands in the position seen in Figs. 1 and 2, is sustained by means of hooks 22 pivotally connected with the edges of the plank 10 and engaging staples or eyes 23 in the said upright; but when these engaging means are disconnected, may be folded back in line—or nearly in line—with the plank 10, so that both the plank and the upright can be slid down over the body 3 and the whole can be reduced in length. Through the upper end of said upright extends a pin 26 directed toward the other pin or screw 6 above referred to. This truck is for transporting cylindrical articles, herein designated by the reference letter A, provided only that said articles have sockets in their extremities into which said pins 6 and 26 may enter. Obviously, in order to adapt the truck to an article of any length within limits, it is only necessary to loosen the wing nut 13 and adjust the movable member 10 over the body 3, the upright being meanwhile raised and fastened in position, then enter the tips of the pins 6 and 26 into the sockets in the ends of the article A, and then tighten up the thumb nut 13; after which the truck is raised by its handles 4 and moved from place to place upon its wheels 2.

What is claimed is:

1. The herein described truck comprising a body having wheels and handles, a bracket rising from its lower end and having a pin projecting upward over the body, an adjustable member lying upon the body and having a longitudinal slot, a bolt passing through said body and slot and having a head above the latter, a wing nut on the lower end of said bolt beneath said body, and an upright rising from the upper end of said adjustable member and having a pin projecting toward the other pin.

2. The herein described truck comprising a body having wheels and handles, a bracket rising from its lower end and having a pin projecting upward over the body, an adjustable member lying upon the body and having a longitudinal slot, a bolt passing through said body and slot and having a head above the latter, a wing nut on the lower end of said bolt beneath said body, an upright rising from the upper end of said adjustable member and having a pin projecting toward the other pin, hinges connecting said upright with the upper end of said adjustable member, eyes in the sides of said upright, and hooks pivotally connected with the edges of said member and detachably engaging said eyes.

In testimony that I claim the foregoing as my own, I have hereto affixed my signature in the presence of two witnesses.

CHARLES McCORD GRIGG.

Witnesses:
F. L. KATNER,
ADOLPH ALTMAN.

Copies of this patent may be obtained for five cents each, by addressing the "Commissioner of Patents, Washington, D. C."